United States Patent Office 2,869,061
Patented Jan. 13, 1959

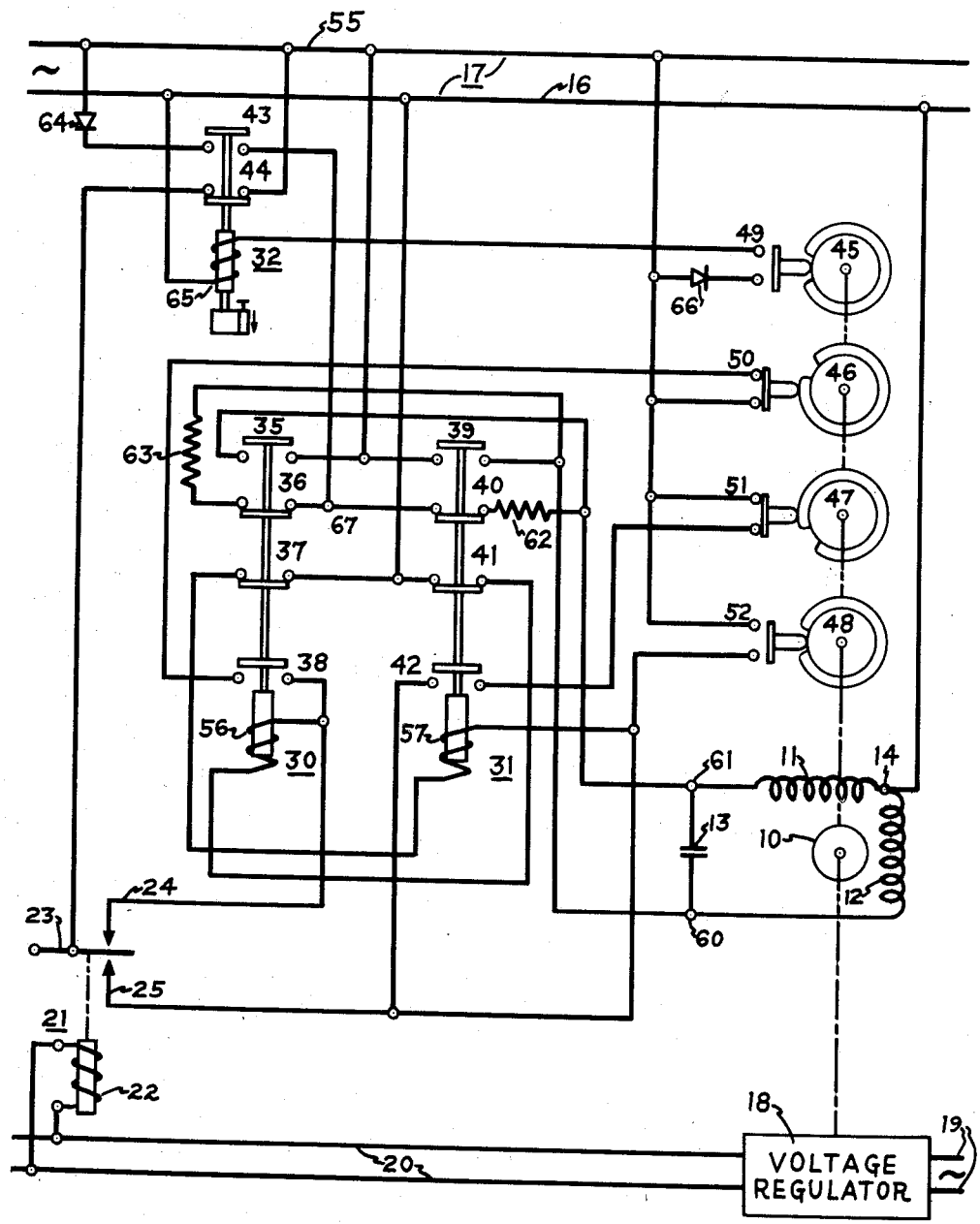

2,869,061

MOTOR CONTROL SYSTEM

Harold E. Pinney, Pittsfield, Mass., assignor to General Electric Company, a corporation of New York Application July 26, 1957, Serial No. 674,459

5 Claims. (Cl. 318—212)

This invention relates to control circuits for alternating current motors, and more in particular to an improved arrangement for dynamically braking an alternating current motor by means of a direct current.

In the past, many arrangements have been provided for dynamically braking alternating current motors by the use of direct current, the direct current being caused to flow through the windings of the motor subsequent to the deenergization of the windings. The braking control arrangement is necessarily made more complex when braking is required for two directions of rotation of the motor shaft.

An example of a dynamic braking arrangement of this type is disclosed in U. S. Patent 2,154,314, which issued on application of S. Minneci, and is assigned to the assignee of the present invention. Minneci discloses a system wherein a pair of control relays selectively energize the windings of a motor, and also energize an auxiliary relay. The auxiliary relay energizes a time delay dropout relay and a bridge rectifier. When the motor is deenergized, a direct current flows to the windings of the motor by way of the contacts of the auxiliary relay until the contacts of the time delay dropout relay are opened. While this circuit has been found to operate satisfactorily, it is desirable to provide an arrangement that does not require as many components, and that does not require a costly full wave rectifier for supplying the direct current for dynamically braking the motor.

It is therefore an object of this invention to provide an improved motor control system.

Another object of the invention is to provide a dynamic braking system for an alternating current motor, the system requiring only a single rectifier for braking of the motor in both directions of rotation.

Briefly stated, in accordance with one aspect of my invention I provide a motor control system comprising a motor having a pair of serially connected windings connected parallel with a capacitor. The junction of the windings is connected to one side of a supply circuit, and contact means are provided for selectively connecting opposite sides of the capacitor to the other side of the supply circuit. Means are provided for applying a direct potential across the motor windings for a predetermined time after disconnection of the windings from the other side of the supply circuit, the breaking means comprising a rectifier and contact means simultaneously connecting the rectifier between the other side of the supply circuit and both sides of the capacitor for the predetermined dynamic braking time, and also for connecting the rectifier between the other side of the supply circuit and one side of the capacitor when that side of the capacitor is connected to the other side of the supply circuit by the selective connecting means.

While the specification concludes with claims particularly pointing out and distinctly claiming the subject matter which I regard as my invention, it is believed that the invention will be better understood from the following description taken in connection with the accompanying drawing.

The drawing illustrates a circuit diagram of a motor control system for dynamically braking an alternating current motor according to my invention.

Referring now to the drawing, therein is illustrated a reversible capacitor motor 10 having a pair of serially connected windings 11 and 12 connected in parallel with a capacitor 13. The junction 14 of the two windings is connected to one side 16 of an alternating current supply circuit 17.

In order to illustrate a typical application in which it is desirable that the motor 10 be controllable for operation and dynamic braking in each direction, in the drawing I illustrate the motor 10 mechanically connected to operate a voltage regulator 18. The regulator may be any conventional form of regulator, such as a step voltage regulator. It will be obvious, of course, that the motor control system of my invention may be employed to function other than as a control for a voltage regulating system without departing from the spirit and scope thereof.

The voltage regulator 18 is connected to an unregulated source of alternating voltage 19 and is arranged to regulate the voltage of a circuit 20. A voltage responsive device, such as a voltage regulating relay 21 is connected to the circuit 20 to provide an initiating circuit for the motor control system. In the drawing, the coil 22 of the voltage regulating relay 21 is connected to the circuit 20. The voltage regulating relay has a pivoted contact arm 23 adapted to selectively contact the contact points 24 and 25.

I also provide a control relay 30, a control relay 31, and a time delay relay dropout relay 32. For the sake of convenience, I will hereinafter refer to the control relays 30 and 31 as the "raise" and "lower" relays respectively, this designation referring to the voltage change that results in the line 20 from the operation or energization thereof. The raise relay 30 has normally open contacts 35, normally closed contacts 36, normally closed contacts 37, and normally open contacts 38. Similarly, the lower relay 31 has normally open contacts 39, normally closed contacts 40, normally closed contacts 41, and normally open contacts 42. The time delay dropout relay has normally open contacts 43, and normally closed contacts 44.

The shaft of the motor 10 is also mechanically coupled to effect the rotation of a plurality of cams 45, 46, 47, and 48, the cams being arranged to operate the contacts 49, 50, 51 and 52 respectively in a manner to be disclosed in more detail in the following paragraphs.

The contact arm 23 of voltage regulating relay 21 is connected to the other side 55 of the supply circuit 17 by way of normally closed contacts 44 of the time delay dropout relay 32. The contact finger 24 of the voltage regulating relay is connected to one side of the coil 56 of raise relay 30, and also to the side 55 of supply circuit 17 by way of normally open contacts 38 of the raise relay 30, and the cam operated contacts 50. The other side of the coil of the raise relay 30 is connected to the supply line 16 by way of normally closed contacts 41 of the lower relay 31. Similarly, the contact finger 25 of the voltage regulating relay is connected to one end of the coil 57 of lower relay 31, and also to the side 55 of supply circuit 17 by way of normally open contacts 42 of the lower relay 31 and cam operated contacts 51. The contact finger 25 is also connected to the line 55 by way of cam operated contacts 52. The other end of the lower relay coil 57 is connected to the line 16 by way of normally closed contacts 37 of the raise relay 30.

The junction 60 between one side of the capacitor 13 and the winding 12 is connected to the line 55 by way of normally open contacts 39 of lower relay 31. Similarly, the junction 61 between the other side of the capacitor and the winding 11 of the motor 10 is connected to the line 55 by way of normally open contacts 35 of raise relay 30. The junction 60 between one side of the capacitor and the winding 12 is connected to the junction 61 between the other side of the capacitor and winding 11 by way of normally closed contacts 40 of lower relay 31 and normally closed contacts 36 of raise relay 30. Current limiting resistors 62 and 63 may be placed in series with the contacts 36 and 40. The junction of the contacts 36 and 40 is connected to the line 55 of supply circuit 17 by way of normally open contacts 43 of time delay relay 32, which are connected in series with a rectifier 64. The coil 65 of the time delay dropout relay 32 is connected between the lines 16 and 55 of supply circuits 17 by way of cam operated contacts 49 and a rectifier 66.

The cams 45 and 48 on the shaft of the motor 10 are cut so that their respective contacts 49 and 52 will be open only when the voltage regulator 18 is on a full step position (assuming the voltage regulator is a step voltage regulator or an induction voltage regulator operable in discreet steps). The cam 46 is cut so that the contacts 50 are open only momentarily prior to reaching a full tap position from one direction, and similarly the cam 47 is cut so that the contacts 51 are open only momentarily before reaching the full tap position from the other direction.

In the drawing, the components are illustrated in their positions at any given full step position of the voltage regulator. Assuming now that the voltage on the line circuit 20 decreases below a desired magnitude, the voltage regulating relay 21 will be actuated to establish contact between a contact arm 23 and contact point 24. This results in the energization of the coil 56 of the raise relay 30 since one end of the coil is connected to the line 55 by way of normally closed contacts 34 of the time delay relay 32 and the contacts of the voltage regulating relay, and the other end of the coil 56 is connected to the line 16 of supply circuit 17 by way of normally closed contacts 41 of the lower relay 31. Upon energization of the raise relay 30 the contacts 35 close to connect the junction 61 to the line 55, thereby energizing the motor 10 to operate the voltage regulator 18 to raise the voltage on the circuit 20. Contacts 37 of the raise relay 30 open in order to prevent operation of the lower relay 31 at the same time as the raise relay 30. The contacts 38 of the raise relay close and connect the end of the coil 56 to the line 55 by way of cam operated contacts 50, to insure operation of the system through a complete cycle in the event that the contacts of the voltage regulating relay open. The contacts 36 of the raise relay open, but at this time serve no function.

After the motor 10 has started to rotate, the cam 45 closes the contacts 49 and energizes the coil of the time delay dropout relay 32. The contacts 44 of the relay 32 thereby open to disconnect the arm 23 of the voltage regulating relay from the line 55 of the supply circuit 17. This connection has been provided in order that a new cycle of operation of the motor control system is not initiated until the completion of the present cycle. The contacts 43 of the time delay dropout relay close and connect the line 55 to the junction 67 between the contacts 36 and 40 by way of the rectifier 64. Since the contacts 36 are open, the junction 67 is connected only to the junction 61 between the capacitor 13 and motor winding 11 by way of resistor 62 and normally closed contacts 40 of the lower relay. However, no direct current flows through the winding 11 at this time since the rectifier is shorted by the contacts 35 of the raise relay 30.

The motor 10 continues to run to effect a voltage change in the regulator 18, and just prior to the complete rotation of the cam 46, the contacts 50 open to deenergize the coil 56 of the raise relay 30. The resultant deenergization of the relay 30 results in the deenergization of the motor 10 by the opening of the contacts 35. The closing of the contacts 36 of the raise relay 30 connects the junction 67 between the contacts 36 and 40 to the junction 60 between the capacitor 13 and winding 12, and direct current flows by way of the contacts 43 of the time delay relay 32 through the windings 11 and 12 of the motor 10 to dynamically brake the motor. The short circuit around the rectifier 64 is removed by opening of the contacts 35. Further rotation of the cams on the motor shaft, resulting from inertia in the motor, results in the opening of the contacts 49 to deenergize the coil 65 of the time delay dropout relay 32. The opening of contacts 49 may, of course, occur prior to the deenergization of the motor without departing from the spirit or scope of my invention. The time delay relay 32 is adjusted so that the contacts 43 remain closed for a predetermined time after the deenergization of the coil 65 in order to effect the complete dynamic braking of the motor 10. When the motor has been completely braked, the contacts 43 reopen to disconnect the direct current from the motor winding, and the contacts 44 of the time delay close to reconnect the line 55 to the arm 23 of the voltage regulating relay in order that a new voltage change initiating signal may be received by the system.

Operation of the motor control system to lower the voltage on the circuit 20 is accomplished in a similar manner by energization of the lower relay 31. In this event, the contacts 39 of the lower relay energize the motor 10 to operate in the opposite direction, the contacts 41 prevent simultaneous operation of the raise relay, the contacts 42 serve as hold contacts until completion of the cycle, and the contacts 40 prevent short circuiting of the capacitor 13 during operation of the motor 10. When the lower relay 31 is energized, the contacts 39 complete the short circuit around the rectifier 64 to prevent flow of direct current in the motor windings during operation of the motor. The cam operated contacts 52 have been provided in order that the lower relay 31 may be energized in the event that loss of power is experienced in the supply circuit 17 during a cycle of operation of the motor control system.

It will be understood, of course, that while the form of the invention herein shown and described constitutes the preferred embodiment of my invention, it is not intended herein to illustrate all the possible equivalent forms or ramifications thereof. It will also be understood that the words employed are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. A motor control system comprising a motor having a pair of serially connected windings connected in parallel with a capacitor, a supply circuit, the junction of said windings being connected to one side of said circuit, means for selectively connecting opposite sides of said capacitor to the other side of said circuit, and means for applying a direct potential across said windings for a predetermined time after the disconnection of said windings from said other side of said circuit comprising rectifier means and contact means simultaneously connecting said rectifier means between the other side of said circuit and both sides of said capacitor for said predetermined time, and between said other side of said circuit and one side of said capacitor when said one side of said capacitor is connected to said other side of said circuit by said selective connecting means.

2. A control system comprising a motor having a pair of serially connected windings connected in parallel with a capacitor, a supply circuit, first and second contact normally open means for selectively connecting said windings in series with said supply circuit, rectifier means, time delay contact means connected in series with said rectifier means, and third and fourth normally closed contact means connecting said time delay contact means and rectifier means in parallel with said first and second contact means respectively, said first and fourth contact means being simultaneously operable and said second and third contact means being simultaneously operable, said time delay contact means being closed during and for a predetermined time after energization of said windings.

3. A motor control system comprising a motor having two serially connected windings connected in parallel with a capacitor, a supply circuit, the junction of said windings being connected to one side of said supply circuit, first and second normally open contact means connected to selectively connect opposite sides of said capacitor to the other side of said circuit, first and second serially connected normally closed contact means simultaneously operable with said first and second normally open contact means respectively and connected in parallel with said capacitor, means for initiating a signal to control said contact means, the normally open contact means being connected to the opposite side of said capacitor as the respective simultaneously operable normally open contact means, serially connected rectifier means and first time delay contact means connected between the other side of said circuit and the junction of said normally closed contact means, second time delay contact means preventing initiating of a signal to said normally open and normally closed contacts, and means closing the contacts of said first time delay contact means during and for a predetermined time after the energization of said windings, and operating said second time delay contact means to prevent initiation of said signal during and for a predetermined time after energization of said windings.

4. A motor control system comprising a motor having first and second serially connected windings, first and second contact means connected to selectively energize said first and second windings respectively, a capacitor connecting in parallel with said serially connected windings, third and fourth serially connected contact means connected in parallel with said capacitor, one side of said third contact means connected to the junction of said capacitor and first windings, and one side of said fourth contact means connected to the junction between said capacitor and second winding, serially connected rectifier and time delay contact means connected between the junction of said third and fourth contact means and one side of said first and second contact means, and means closing said time delay contact means during and for a predetermined time after energization of said first and second windings, said third and fourth contact means being closed except when said second and first windings respectively are energized.

5. A motor control system comprising a motor having first and second windings, one side of each of said windings connected to one side of a supply circuit, first and second contact means connected to selectively connect the other sides of said first and second windings respectively to the other side of said supply circuit, a capacitor connected between the first junction of said first winding and contact means and the second junction of said second winding and contact means, third and fourth serially connected contact means connected respectively between said first and second junctions, a rectifier having one side connected to the other side of said supply circuit, and time delay means for connecting the other side of said rectifier to the junction of said third and fourth contact means when said windings are energized and for a predetermined time thereafter, said third and fourth contact means being closed except when said second and first windings respectively are energized.

References Cited in the file of this patent
UNITED STATES PATENTS

| | | |
|---|---|---|
| 2,438,724 | Sutherland | Mar. 30, 1948 |
| 2,740,932 | King | Apr. 3, 1956 |